F. L. SWANBERG.
GREASE CUP.
APPLICATION FILED MAR. 7, 1908.

906,333.

Patented Dec. 8, 1908.

Witnesses.
Homer Bradford.
Bessie Beall.

Inventor:
Floyd L. Swanberg
By Alfred M. Allen
Atty

UNITED STATES PATENT OFFICE.

FLOYD L. SWANBERG, OF CINCINNATI, OHIO, ASSIGNOR TO D. T. WILLIAMS VALVE COMPANY, OF CINCINNATI, OHIO, A CORPORATION OF OHIO.

GREASE-CUP.

No. 906,333.

Specification of Letters Patent.

Patented Dec. 8, 1908.

Application filed March 7, 1908. Serial No. 419,730.

*To all whom it may concern:*

Be it known that I, FLOYD L. SWANBERG, a citizen of the United States, residing in the city of Cincinnati, county of Hamilton, and State of Ohio, have invented certain new and useful Improvements in Grease-Cups, of which the following is a full, clear, and exact description, reference being had to the accompanying drawings, forming part of this specification.

My invention relates to cups for holding grease for the lubrication of journal bearings and the like, and the purpose of the invention is to provide a simple, cheap and effective means for holding packing for the cup securely in place without the necessity of providing washers or other retaining means such as have heretofore been employed, and the invention consists of that novel construction to be hereinafter particularly pointed out and claimed.

Figure 1:
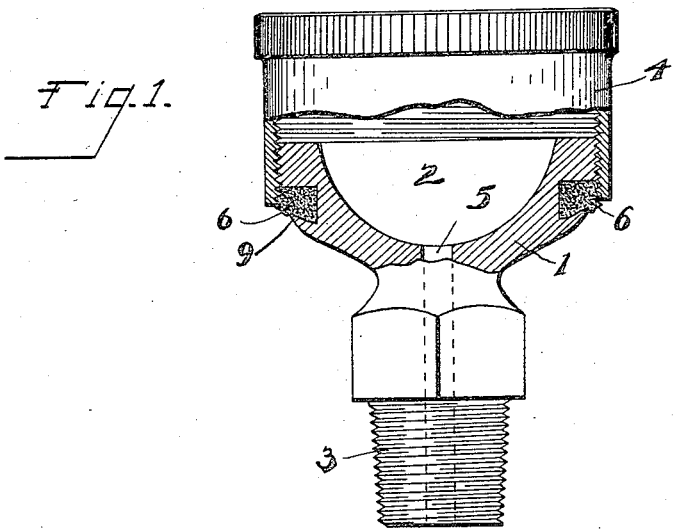
Figure 2:
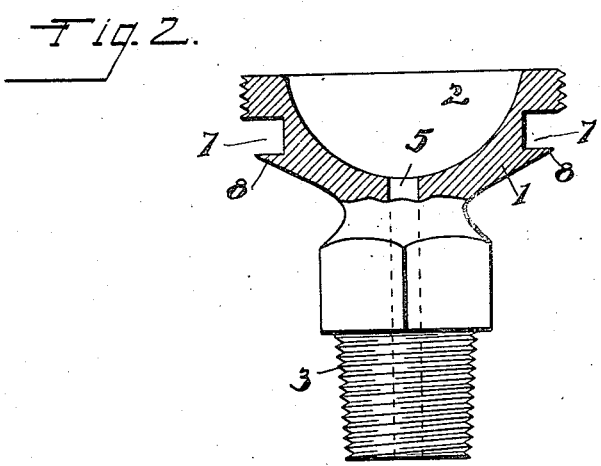

In the drawings: Figure 1 is a central vertical section of my improved cup. Fig. 2 is a similar vertical section of the base of the cup before the insertion of the packing.

1 is the base of the cup provided with a semispherical depression 2 in its upper surface, threaded at its lower end 3 for attachment to the journal bearing and threaded exteriorly at its upper end for the reception of the interiorly threaded cap 4.

5 is the central bore through the base for the passage of the grease to the journal bearing.

In order to retain the packing 6, of leather or other suitable material, in place, in constructing the base an annular groove 7 is cut so as to leave a fin of metal 8 for the lower surface of the groove. The packing 6 is then placed in the groove 7 and the fin of metal upset to grasp and hold the packing as shown at 9 in Fig. 1. The packing is thus held securely in place and in addition to being securely held, the compression of the packing as the metal fin is upset, forces the packing outward so as to form a tight joint with the lower end of the cap 4 thus preventing all leakage.

With this construction no washer or means are required for holding the packing in place, and the cost of production is therefore materially reduced, while at the same time providing a construction which will retain securely and expand the packing to accomplish the result required.

Having thus described my invention, what I claim as new and desire to secure by Letters Patent is:

In a grease cup, the combination, with the base provided with an aperture for the passage of the grease to the bearing, and a cap to cover the base and form a closed receptacle for the grease, there being an annular groove of substantial depth formed in the cylindrical outer surface of the base, a packing, of suitable material mounted in said groove, with a fin of metal forming the lower wall of the groove upset into the packing to hold the packing in place, substantially as shown and described.

FLOYD L. SWANBERG.

Witnesses:
FRANK W. KIMBEL,
BESSIE BEALL.